United States Patent
Horesh

(10) Patent No.: US 6,817,468 B2
(45) Date of Patent: Nov. 16, 2004

(54) NECK STRAP AND LOCKET ASSEMBLY

(75) Inventor: Zvi Horesh, Rishon Lezion (IL)

(73) Assignee: Trend Design Patent Ltd., Tel Aviv (IL)

( * ) Notice: Subject to any disclaimer, the term of this patent is extended or adjusted under 35 U.S.C. 154(b) by 35 days.

(21) Appl. No.: 09/959,859

(22) PCT Filed: Feb. 27, 2001

(86) PCT No.: PCT/IL01/00187

§ 371 (c)(1),
(2), (4) Date: Mar. 25, 2002

(87) PCT Pub. No.: WO01/81984

PCT Pub. Date: Nov. 1, 2001

(65) Prior Publication Data

US 2002/0117406 A1 Aug. 29, 2002

(30) Foreign Application Priority Data

Apr. 25, 2000 (IL) ............................................... 135 816

(51) Int. Cl.[7] .......................... A45C 11/00; A45C 11/04; A45C 15/00; B65D 69/00
(52) U.S. Cl. ................................ 206/37; 206/5; 206/38; 206/579
(58) Field of Search ............................... 206/37, 38, 5, 206/6, 216, 223, 575, 579, 806; 351/155–158; D16/330, 335, 336, 339

(56) References Cited

U.S. PATENT DOCUMENTS

| 3,647,059 A | 3/1972 | Humphreys |
| 4,389,132 A | 6/1983 | Valadez |
| 4,818,134 A * | 4/1989 | Tsai ............................ 206/226 |
| 4,854,449 A | 8/1989 | Fitzhugh |
| 4,937,920 A | 7/1990 | Tsai |
| 5,000,204 A | 3/1991 | Smith |
| 5,102,216 A * | 4/1992 | Mitchell ......................... 206/5 |
| 5,151,778 A * | 9/1992 | Conley ........................... 206/5 |
| 5,235,355 A * | 8/1993 | May ............................ 351/156 |
| 5,299,682 A * | 4/1994 | Tatar .............................. 206/5 |
| 5,366,072 A | 11/1994 | Goldenberg |
| 5,735,393 A * | 4/1998 | Shiue et al. .................... 206/5 |
| 6,092,897 A * | 7/2000 | Smerdon, Jr. ............... 351/156 |
| 6,131,209 A * | 10/2000 | Thayer et al. ............... 351/157 |
| 6,206,217 B1 * | 3/2001 | Chiang ......................... 206/37 |

FOREIGN PATENT DOCUMENTS

WO          86/02463          4/1986

* cited by examiner

*Primary Examiner*—Lee Young
*Assistant Examiner*—J. Gregory Pickett
(74) *Attorney, Agent, or Firm*—Browdy and Neimark, P.L.L.C.

(57) ABSTRACT

A neck strap attachable to the foldable side pieces of a pair of eyeglasses, making it possible for an individual to wear his glasses hanging from the neck, with a decorative locket of rigid material, joinable to the cable of the neck strap, and having a lens cleaner stored therein. The locket in combination with the neck strap creates a decoration located at the rear of the individual's neck, which complements the appearance of the eyeglasses.

4 Claims, 1 Drawing Sheet

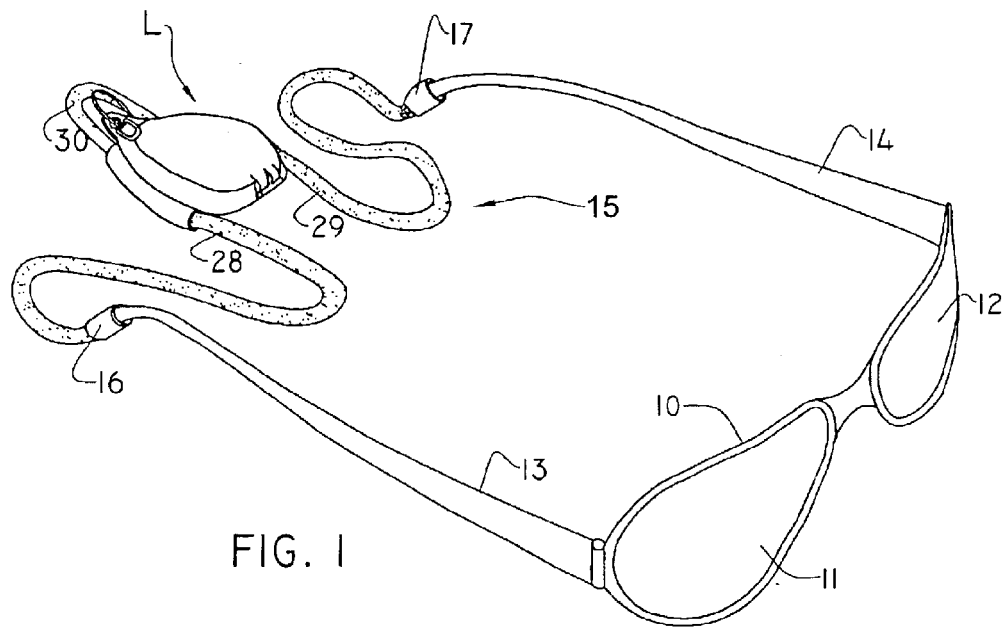
FIG. 1
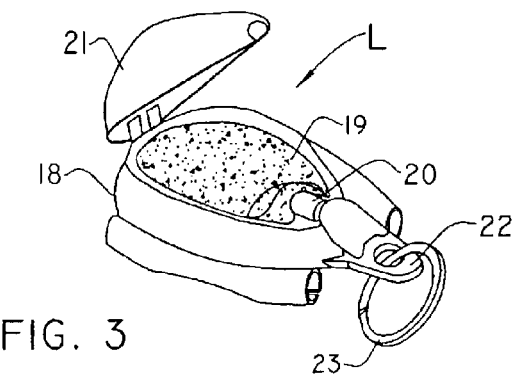
FIG. 3
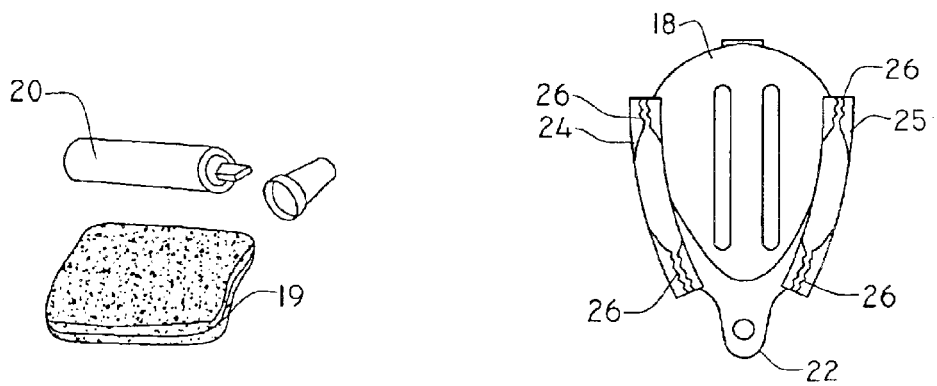
FIG. 2
FIG. 4

NECK STRAP AND LOCKET ASSEMBLY

REFERENCE TO RELATED APPLICATIONS

The present application is the national stage under 35 U.S.C. 371 of international application PCT/IL01/00187, filed Feb. 27, 2001, which designated the United States, and which international application was published under PCT Article 21(2) in the English language.

FIELD OF THE INVENTION

This invention relates generally to eyeglass accessories, and in particular to accessories associated with neck straps.

BACKGROUND OF THE INVENTION

A standard pair of eyeglasses consists of a pair of lenses mounted on a frame and foldable temple or side pieces hinged to opposite sides of the frame. When an individual wears eyeglasses over his eyes, the side pieces then lie against the temples of the wearer and extend over the ears to hold the glasses in place.

Prescription eyeglasses serve to correct visual defects. Many eyeglasses may be prescribed for reading purposes only, in which event the wearer will wear the eyeglasses in a reading mode, and take them off in a viewing mode during which the eyeglasses are unsuitable.

In many situations it is necessary to switch from one mode to another at fairly frequent intervals. This switching action is facilitated by a neck strap attached to the eyeglasses, for when the wearer removes the eyeglasses from his eyes, they are then suspended by the strap from his neck at which position the wearer can conveniently later raise the glasses to again cover his eyes.

Those wearing glasses need to clean them from time to time. One wearing eyeglasses with a neck strap needs to clean them still more often for, when repeatedly switching from the mode in which the glasses cover the eyes to one in which the glasses are suspended from the neck, the wearer is likely to smudge the lenses. In order to then clean the lenses, the wearer needs a lens cleaner available at any time.

It is known to provide a portable lens cleaner so that a wearer of glasses can clean its lenses when the need to do so arises away from home. Thus the U.S. Pat. No. to Fitzhugh 4,854,449 describes a portable lens cleaner formed by a tubular case having a reusable, lens-cleaning chamois cloth. The Valady U.S. Pat. No. 4,389,132 shows a lens cleaner in the form of a felt-tipped pen whose cap contains a cleaning solution. U.S. Pat. No. 5,000,204 to Smith shows a portable eyeglass cleaning kit in which a cleaning cloth is housed in a small can.

U.S. Pat. No. 5,366,072 to Goldenberg discloses a pouch joined to a neck strap for storing eyeglasses or small objects. The pouch is made of soft material and can be rolled up to form a cylindrical pack that is joined to the neck strap whose ends are releasably attachable to the foldable arms of the eyeglasses.

SUMMARY OF THE INVENTION

The main object of the invention is to provide a new accessory for storing a lens cleaner which is to be combined with a neck strap associated with a pair of eyeglasses.

In accordance with the present invention, the novel accessory is a locket. By definition, a locket is a small case having space therein for a memento or other small object, the locket being worn suspended by a chain. A locket in accordance with the invention is a miniature container, preferably smaller than an eyeglasses lens to be combined with a neck strap for carrying a lens cleaner on the one hand and, on the other hand, for creating an attractive decoration that may complement the appearance of the eyeglasses associated therewith.

In accordance with the present invention there is provided a locket and neck strap assembly joinable to the side pieces of a pair of eyeglasses, the assembly comprising: a neck strap consisting of a flexible cable and end couplers adapted to engage the side pieces; and a rigid locket joined to the cable and so placed thereon that when the assembly is worn by an individual and the eyeglasses are suspended from the front of his neck, the locket is suspended from the rear thereof, the locket having a cleaner therein for the lenses of eyeglasses.

In accordance with one embodiment of the invention, the locket is provided with integral channels adapted for receiving the cable of a standard neck strap. The channels have longitudinal slots allowing the cable to be inserted therein without having to be detached from the side pieces. The channels may be spaced by a gap for pulling out of it a part of the cable and tightening the eyeglasses to user's head.

With the assembly of the present invention, when the wearer of the spectacles is in need of a lens cleaner, the cleaner is at hand. Also, since the locket is rigid, it may be tightly closed and adapted to accommodate a lens cleaning cloth, a phial of cleaning liquid, a lens cleaning pen, or the like, and to protect said objects from ambient dust, from grease and sweat associated with the hair, and from breaking.

The locket may serve as a decoration so that when the assembly is in place, the decorative locket lies behind the neck and its attractiveness can further be enhanced by styling. The rigid material of the locket provides a suitable surface for placing a text, a logo or other image, or the material itself may be molded in a shape resembling another object; thus the assembly of the present invention may give rise to a new line of advertising and promoting accessories.

BRIEF DESCRIPTION OF THE DRAWINGS

For a better understanding of the invention as well as further objects and other features thereof, reference is made to the attached drawings wherein:

FIG. 1 is a perspective view of a pair of eyeglasses having attached thereto a neck strap and locket assembly in accordance with the invention;

FIG. 2 separately illustrates the lens cleaners to be stored in the locket;

FIG. 3 shows the locket with its lid raised to expose the lens cleaners stored therein;

FIG. 4 is a bottom view of the locket.

DETAILED DESCRIPTION OF A PREFERRED EMBODIMENT

Referring now to FIG. 1, there is shown a pair of eyeglasses having a plastic or metal frame 10 in which is mounted a pair of lenses 11 and 12. Hinged to opposite ends of frame 10 are foldable side pieces 13 and 14. Attachable to the extremities of side pieces 13 and 14 is a neck strap consisting of a flexible cable 15, preferably formed of braided fabric material, having couplers 16 and 17 attached to their ends. The couplers engage the extremities of side pieces 13 and 14 of the glasses. Joinable to the cable is a rigid locket, which is slidable along the cable but is preferably coupled at cable's midpoint so that the locket is symmetrically arranged with respect to end couplers 16 and 17.

Locket L includes a small case 18 in which is housed a lens cleaning cloth 19 and a lens cleaning pen 20. Pen 20, as shown separately in FIG. 2, has a felt tip and a removable cap. Both the pen and the cloth are snugly nested in case 18. Hinged to case 18 is a closure lid 21. The lid and case of the locket is molded or otherwise fabricated of high strength plastic such as polypropylene or polycarbonate.

Locket L as shown in FIGS. 3 and 4 has the shape of a shield provided with tapering sides that converge toward a curved end. Formed along the tapered sides of the case 21 and conforming to the curvature thereof are channel segments 24 and 25 having a C-shaped cross section so that each channel has a longitudinal slot 26 therein, preferably of Z-like or S-like shape. The pliable cable 15 of the neck strap can be forced through the slot 26 to be received within the channel. Thus it is a simple matter to attach the cable of a neck strap to the locket without detaching any of couplers 16 or 17.

The channel segments 24 and 25 are so designed as to run along at least half circumference of the locket L and to keep apart branches 28 and 29 of the cable coming from the side pieces 13 and 14 by a distance about the diameter of the locket. This configuration provides for the stable and comfortable position of the locket on the neck of the user.

The gap between the channel segments 24 and 25 allows a cable loop 30, FIG. 1, to be pulled out and the eyeglasses to be tightened to the head of the user during a physical activity. Furthermore, the channel segments are of curved form or, alternatively, consist of a plurality of non-coaxial parts with the purpose to increase friction with the cable and to ensure the retaining of the tightened condition.

Extending from the lower end of case 18 is a lug 22 from which is suspended a ring 23 for carrying a small object, such as an amulet or a key. Alternatively, a locket of the present invention with the ring 23 may be detached from the neck strap and used as a key-holder.

The present invention which resides in an assembly of a locket and a neck strap can be associated with eyeglasses of any style, as long as the side pieces of the eyeglasses are capable of being coupled to a neck strap. Hence the style of the spectacles shown in FIG. 1 is by way of example only. And while the locket included in the assembly is not limited in style to the style which is illustrated herein, the style that is adopted should be in harmony with the style of the eyeglasses. For example, if the frame of the eyeglasses and the lenses are oval in form, then an ovoidal shape for the locket would be appropriate. And if the frame of the glasses is of black plastic material, a similar material should be that used for the locket.

Once the locket is combined with a neck strap, the wearer not only has a necklace which complements the appearance of the eyeglasses and is a cosmetic asset, but also has available at all time lens cleaners for the lenses of his spectacles.

While there has been shown a preferred embodiment of a locket and neck strap assembly, it is to be understood that many changes may be made therein without departing from the spirit of the invention.

What is claimed is:

1. A locket and neck strap assembly joinable to the side pieces of a pair of eyeglasses having lenses, said assembly comprising a neck strap consisting of a flexible cable and end couplers therefor adapted to engage the side pieces; and a rigid locket joined to the cable and so placed thereon that when the assembly is worn by an individual and the eyeglasses are then suspended from the front of his neck, the locket is then located at the rear thereof, said locket being adapted to accommodate a cleaner therein for said lenses, where said locket is joined to the cable by a channel integral with the locket and receiving the cable, said channel consisting of at least two parts and a gap therebetween, said gap allowing for pulling out a part of the cable and tightening the eyeglasses to user's head.

2. An assembly as set forth in claim 1, wherein the cleaner is a piece of soft material.

3. An assembly as set forth in claim 1, wherein the rigid locket has substantially a flat bottom surface and a dome-shaped top surface.

4. An assembly as set forth in claim 1, wherein the cleaner is a felt-tipped pen.

\* \* \* \* \*